March 12, 1968

F. CLYNCH 3,372,770

SHEAR WAVE TRANSDUCING APPARATUS

Filed Jan. 21, 1966

INVENTOR.
FRANK CLYNCH
BY
William J. Miller
ATTORNEY

INVENTOR.
FRANK CLYNCH

United States Patent Office 3,372,770
Patented Mar. 12, 1968

3,372,770
SHEAR WAVE TRANSDUCING APPARATUS
Frank Clynch, Ponca City, Okla., assignor to Continental Oil Company, Ponca City, Okla., a corporation of Delaware
Filed Jan. 21, 1966, Ser. No. 522,099
14 Claims. (Cl. 181—.5)

ABSTRACT OF THE DISCLOSURE

A shear wave vibrator coupled to the surface of the earth by applying weight to a base plate and further coupled by earth engaging members attached to the base plate and hydraulically depressing into the ground.

---

This invention relates to improvements in the art of seismic wave generation, and more particularly, but not by way of limitation, to an apparatus for generating and coupling shear wave forces to an earth medium.

The present invention contemplates seismic signal generation equipment of the vibrational type which enables greater coupling to an earth medium and therefore a greater output of useable seismic wave energy. More particularly, the invention contemplates wave generation apparatus of the vehicle mounted type wherein a vibrator is mounted on a base member which is maintained in coupling contact with an earth medium through vertical hydraulic force as applied between said vehicle and said base member, and further earth engaging members are then placed on each side of the coupling or base member and in-line with the shear forces to be exerted, each of the engaging members being hydraulically depressed and hydraulically extended outward from the base member by a force at least as great as the vibrational forces.

Therefore, it is an object of the present invention to provide a vehicle mounted, shear wave transducing device which enables greater coupling of shear wave energy into an earth medium and which is easily and rapidly coupled and decoupled for wave generation at successive sites.

It is further an object of this invention to provide shear wave generation apparatus of greater output efficiency, the coupling mechanisms of which are hydraulically controlled and provide frictional gripping as well as in-line bracing with the earth or elastic transmission medium.

Finally, it is an object of the present invention to provide a vehicle mounted, vibrational shear wave transducer which is capable of coupling a large portion of the total vibration force into an earth medium over a vibration frequency having a broad bandwidth.

Other objects and advantages of the invention will be evident from the following detailed description when read in conjunction with the accompanying drawings which illustrate the invention.

Figures 1, 3:
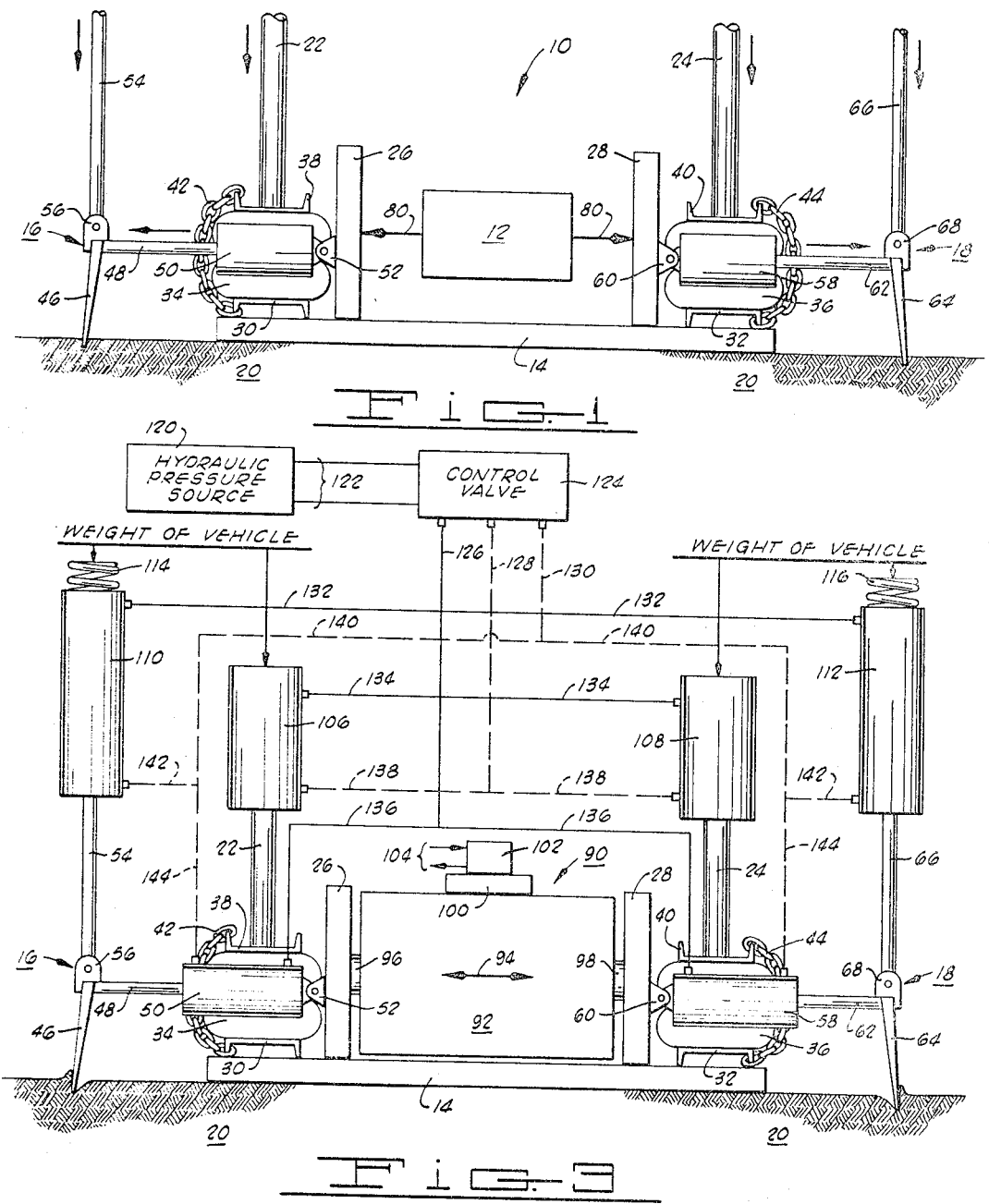
FIGURE 1 is a partially schematic front view of the shear wave apparatus in an operational or coupled attitude.
FIGURE 3 is an operational view of the shear wave coupling apparatus including the hydraulic coupling control and employing a hydraulic type of vibrator unit.

Referring now to the drawings, and in particular to FIGURE 1, a transducer constructed in accordance with the present invention is indicated generally by the reference numeral 10. The shear wave transducer 10 is comprised of a vibrator 12, a first coupling or base member 14 and the lateral bracing elements indicated generally by 16 and 18. The base plate 14 is maintained in rigid contacting relationship to the earth medium 20 by hydraulic force as applied on the piston rods 22 and 24 through a resilient coupling member to be described below.

The base member 14, preferably of heavy steel construction, has two upright support plates 26 and 28 suitably mounted thereon as by welding or other rigid fastening techniques. The vibrator unit 12 is secured in an appropriate manner between the vertical support plates 26 and 28 for its vibrational operation. The vibrator unit 12 may be any of the conventional types of heavy vibrators suitable for seismic work, such as hydraulic, electromagnetic, pneumatic, etc. The base member 14 has a pair of inverted channel pieces 30 and 32 rigidly secured to the top surface at each end of the base member 14.

A pair of pneumatic pillow blocks or bags 34 and 36 are secured atop each of the channel pieces 30 and 32, respectively, and these pneumatic pillow bags provide vibration damping or isolation between the vibrating apparatus and the supporting vehicle or other platform carrying the equipment. The pillow bags 34 and 36 are a conventional type of damping device and comprise a pair of heavy neoprene enclosures with restricted air passage between the two sections. The pillow bags are more fully disclosed in the U.S. Patent No. Re. 25,401, entitled, "System for Anchoring and Transporting a Seismic Vibrator," issued to F. Clynch and assigned to the present assignee. A second pair of channels 38 and 40 are secured on top of the respective pillow bags 34 and 36, and are welded or otherwise secured to the respective rods 22 and 24. A section of chain 42 is connected between the upper and lower channel members 38 and 30 and, similarly, a section of chain 44 is connected between the channel members 40 and 32. These connections 42 and 44 need not be chain but could be suitable lengths of wire rope, steel spring or any other device capable of supporting the weight of the shear wave apparatus when it is raised in its decoupled or portable position.

Figure 2:
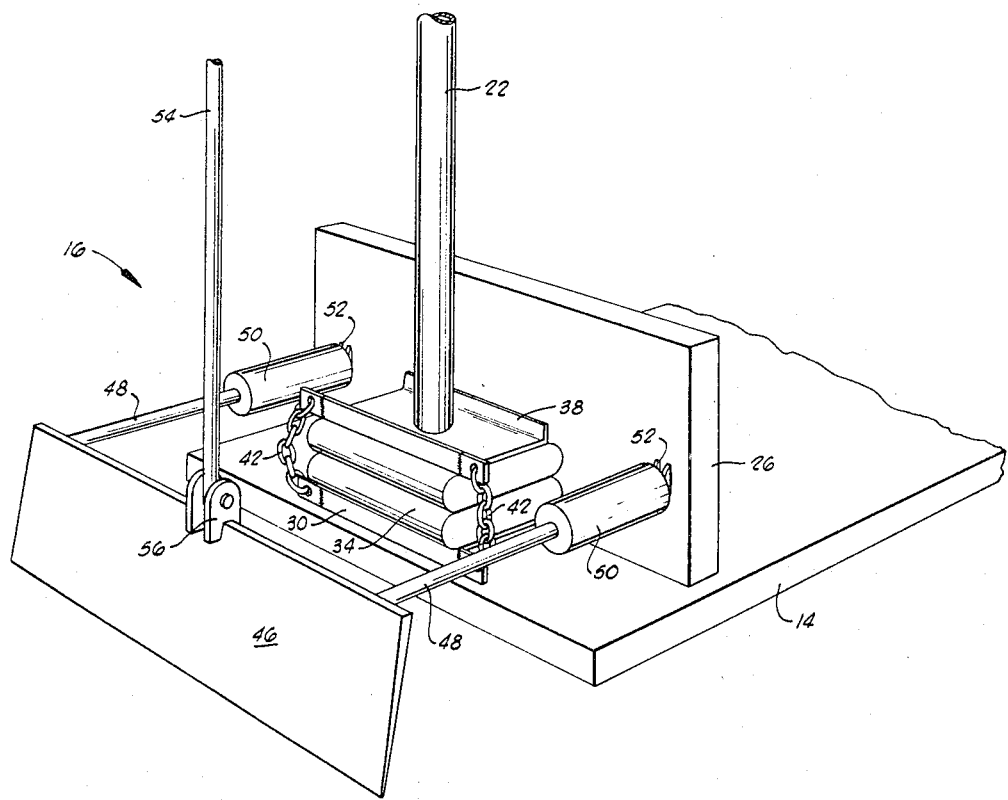
FIGURE 2 is a partial isometric view of one side of the shear wave coupling apparatus.

As shown in FIG. 2, the lateral engagement or bracing device 16 comprises a vertical plate 46 rigidly connected to a pair of horizontally extending piston rods 48. The piston rods 48 are connected to the opposite end portions of the plate 46 at its upper edge of the plate by welding or the like. Each piston rod 48 extends from a piston (not shown) reciprocally disposed in a hydraulic cylinder 50. Each cylinder 50 is, in turn, pivotally connected to the vertical plane 26 by a clevis 52. Vertical force is applied to the plate 46 through a hydraulically actuated piston rod 54 which is pivotally connected to a bracket 56. The bracket 56 is welded or otherwise rigidly connected to the upper edge of the plate 46.

The opposite lateral engaging or bracing device 18 (see FIG. 1) is constructed in the same manner with a pair of hydraulic cylinders 58 (only one of which is shown) connected to the upright support plate 28 by a clevis 60, and with the piston rod 62 being rigidly connected to a vertical plate 64. The downward force is then exerted through a piston rod 66 pivotally connected to a bracket 68 on the upper edge of vertical plate 64. The hydraulic cylinders 50 and 58 are operated in parallel at equal pressures as will be described below.

As will be further described, the hydraulic cylinders controlling the respective vertical piston rods 54 and 66 are suitably mounted on the support vehicle such that vibration damping is effected between the vehicle (not shown) and the vertical plate 46. Similarly, the hydraulic piston rods 22 and 24 have damping or vibration isolation provided by the pneumatic pillow bags 34 and 36 as previously described.

In the operation of the shear wave transducing device 10, the transducing device is first lowered by hydraulic extension of the piston rods 22 and 24 to bring the base member 14 into contact with the earth medium 20. The amount of downward force is variable depending upon the requirements of terrain and so forth. However, it is generally provided that the entire weight of the support vehicle is supported upon the extended rods 22 and 24. Also, in order to increase still further the shear coupling between the base member 14 and earth medium 20, it may be desirable to provide a series of conical or pyramidal cleets or reliefs (not shown) on the bottom of base member 14. Prior teachings to this type of coupling may be found in U.S. Patent No. 3,159,233, entitled, "Seismic Transducer Construction," issued to Clynch et al. and assigned to the present assignee.

Once the piston rods 22 and 24 have been suitably extended to place sufficient vehicle weight upon the base member 14, the lateral engaging or bracing devices 16 and 18 are positioned in the earth medium 20. The piston rods 54 and 56 are controlled to exert a vertical force equal to or greater than the supporting mass to drive the vertical plates 46 and 64 into the earth medium 20. Also, the horizontal hydraulic cylinders 50 and 58 extend their respective piston rods 48 and 62. The horizontal forces on the vertical plates 46 and 64 should be at least as great as the horizontal components of force exerted by the vibrator unit 12. Thus, increased transfer of the horizontal force of the vibrator unit 12 into the earth medium 20 is assured.

The vibrator device 12 reciprocates in the direction of the arrows 80 and transmits its alternating forces to the upright support members 26 and 28 which, in turn, place the rapidly reversing forces on the base member 14 in contact with the earth medium 20. The alternating forces are transmitted into the earth medium 20 as a shear-type wave characterized by earth particle motion normal to the direction of propagation through the earth medium 20. The lateral engaging devices 16 and 18 serve to further increase coupling of the vibration energy into the earth medium 20 by reducing the lateral motion which can be imparted to the base member 14 with respect to the earth member 20. With constant hydraulic pressure applied to the horizontal cylinders 50 and 58, the tendency for base member 14 to slide laterally is continually opposed. Further, coupling of the shear wave energy is not only effected through the base member 14 but the vertical brace plates 46 and 64 provide further shear wave coupling into the arth medium 20.

After the generation of the necessary shear wave input to the earth medium 20 at the particular shooting site, the transducer coupling device 10 can be disengaged from the earth medium 20 and moved to the next signal generation site in accordance with the shooting plan. This is done by controlling the appurtenant hydraulic equipment to retract the piston rods 22 and 24, thereby removing the weight of the support vehicle from over the base member 14 and then, successively, drawing the transducer coupling device 10 up into a transport position on or beneath the vehicle. Simultaneously, the piston rods 54 and 66 are retracted to disengage the vertical plates 46 and 64 and to maintain them in a portable position on the support vehicle. The horizontal cylinders 50 and 58, being attached pivotally to the vertical plates 26 and 28, can merely be lifted upward with the retraction of the piston rods 54 and 66. The support vehicle can then be moved on to the next shooting site; whereupon the transducer coupling device 10 would again be firmly engaged or implanted upon the earth medium 20 for the next shot or vibration sequence.

FIGURE 3 shows the transducer coupling device with the attendant hydraulic control equipment, and it shows the utilization of a linearly actuated hydraulic vibrator 90 as the shear wave source. The hydraulic vibrator 90 is a type which is well known in the art and it is the particular subject matter of U.S. Patent No. 3,159,233, previously referred to. The vibrator 90 comprises a reaction mass 92 which reciprocates in the direction of arrow 94 in response to hydraulic actuation of an interior piston assembly (not shown). The interior piston rods 96 and 98 are shown in engagement with the vertical support members 26 and 28. A suitable manifold 100 is mounted on the reaction mass 92 for the purpose of directing the fluid pressures from a servo valve 102 to the proper fluid supply ports (not shown) leading into the interior of the reaction mass 92. The hydraulic control pressure is applied at 104 to the servo valve 102, a conventional type of four-way control valve which can be electrically actuated to control the reciprocation of reaction mass 92.

The piston rods 22 and 24 are reciprocal from within hydraulic cylinders 106 and 108, while the rods 54 and 66 to the lateral engaging devices 16 and 18 are controlled from vertical hydraulic cylinders 110 and 112. The vertical hydraulic cylinders 106, 108, 110 and 112 are all suitably mounted on the support vehicle in accordance with practice in the art. The hydraulic cylinders 106 and 108 may be mounted on or beneath a truck bed and they may be mounted directly thereto since isolation takes place through the pneumatic pillow bags 34 and 36 below the piston rods 22 and 24. The lateral engaging cylinders 110 and 112 (vertical) should be mounted to the support vehicle through a suitable heavy spring fixture to provide isolation between the vibratory components and the support vehicle. A pair of coil springs 114 and 116 are shown to generally indicate the desirability for damped mounting. More particular information as to vehicle mounting and spring isolation of vibratory equipment is presented in the aforementioned U.S. Patent No. Re. 25,401, entitled, "System for Anchoring and Transporting a Seismic Vibrator."

The hydraulic control equipment can be operated from a separate engine (not shown) which may be mounted on the support vehicle or, if desired, it may be operated from a power take-off source from the support vehicle engine. In FIGURE 3, the control and regulation apparatus is shown generally as the hydraulic pressure source 120 providing high pressure fluid circulation on the pressure lines 122 to a control valve 124. The control valve 124 is a commercially available type of four-way valve which utilizes the usual fluid inlet and exhaust lines 122 from pressure source 120. A port 126 provides actuating pressure to all cylinders while reverse ports 128 and 130 have differing functions. The port or line 128 can be completely shut off while the port or line 130 can be maintained open and exerting constant pressure on the load.

The control line 126 supplies fluid pressure to the input side of each of the hydraulic cylinders. That is, control line 126 is led to three parallel branches; branch 132 to the vertical cylinders 110 and 112, branch 134 to the main lift cylinders 106 and 108, and the branches 136 to the horizontal cylinders 50 and 58. The intermittent return line 128 is led from the output side of the main lift cylinders 106 and 108 on branch lines 138. The constant pressure return line 130 is connected to each of the horizontal and the remaining vertical cylinders, as by branch line 140 and 142 to the vertical cylinders 110 and 112 and the further branch lines 144 to each of the horizontal cylinders 50 and 58.

In operation, the support vehicle (not shown) is positioned at a pre-selected vibration sit whereupon the necessary hydraulic control is effected to move the shear wave apparatus into energy coupling relationship with the earth medium 20. The control valve 124 is actuated to provide pressure application on control line 126 with the simultaneous pressure withdrawal on control lines 128 and 130. After sufficient pressure application, the piston rods 22 and 24 are extended, bringing the base member 14 into secure engagement upon the earth medium 20 or, in other words, bringing a large amount of the weight of the support vehicle to bear directly upon the base member 14. Simultaneously, the piston rods 54 and 66 are extended to drive the vertical engaging plates 46 and 64 downward into the earth, while the horizontal piston rods 48 and 62 are extended to force the earth engaging plates 46 and 64 outward.

Once the support vehicle is properly raised and positioned to bear upon the base member 14, the control valve 124 can be actuated to cut off the control line 128, thereby holding the main lift cylinders 106 and 108 in their raised positions. However, the control line 130 remains open so that a constant pressure can be maintained upon the vertical hydraulic cylinders 110 and 112 and the horizontal hydraulic cylinders 50 and 58. This provision of constant pressure allows that any loosening or slackening in the grip of engaging plates 46 and 64, as the vibrator 90 reciprocates, can be continually taken up with the constant extending force exerted on the vertical rods 54 and 66 and the horizontal piston rods 48 and 62.

When a secure positioning is assured, the vibrator 90 can be run through its sequence of seismic output vibrations. The vibrator 90 reciprocates in the direction of arrow 94, transmitting these forces to the base member 14, as well as to the engagement points of the earth engaging plates 46 and 64. The total effect is to impart a shear wave into the earth medium 20 at a high degree of coupling efficiency.

After the particular shot sequence, the shear wave transducing apparatus is disengaged or uncoupled from the earth medium 20 and the support vehicle can then move on to the next vibration site. This may be done simply by reversing the four-way control valve 124 to retract each of the various hydraulic piston rods. Thus, the control line 126 withdraws fluid pressure from each of the vertical cylinders 110 and 112 the main lift cylinders 106 and 108, and the horizontal cylinders 50 and 58. The circuiting application of fluid pressure is applied through the control lines 128 and 130 to the respective hydraulic cylinders. It is also contemplated that a pressure reducer (not shown) may be inserted in the hydraulic control line 136 for the purpose of interjecting a delay or force lag in the extension of horizontal hydraulic cylinders 50 and 58.

The retraction procedure preferably brings the shear wave transducing and coupling apparatus up under or behind the support vehicle with sufficient clearance from the roadway surface such that there is little danger of the equipment being harmed by strinking raised objects. The amount of clearance would be a matter of choice, depending upon the particular intended usage, and it could be varied within wide limits depending upon the height and location of mounting of the various hydraulic cylinders on the support vehicle.

The foregoing sets forth a novel apparatus which insures positive coupling of shear wave vibration energy into the earth medium at any force which is generated by the vibrator. The vibrator and coupling mass are entirely isolated from the support vehicle, such that the coupling weight or downward force of the vehicle upon the shear wave apparatus does not enter into the considerations of shear wave frequency which must be followed in analyzing any returned signals. Further, the shear wave coupling device provides lateral engaging plates which have a holding force greater than the lateral force output of the shear wave vibrator unit, such that a positive coupling at all vibrator frequencies is assured.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. A device for transmitting a horizontally directed, periodically reversing force to the surface of the earth comprising:
   a base member placed in secure engagement to said surface of the earth;
   means coupled to said base member for imparting a horizontal, periodically reversing force parallel to said base member; and
   additional means pivotally attached to said base member and engaging the earth on each side of said base member in line with said horizontal force.

2. A device as set forth in claim 1 wherein each of said additional means engaging the earth comprises:
   a vertical engaging plate member;
   means for maintaining a force depressing said vertical engaging plate member into the earth; and
   means for maintaining a horizontal force between said vertical engaging plate member and said base member which is at least equal to said horizontal, periodically reversing force.

3. A device as set forth in claim 2 wherein said means for imparting horizontal, periodically reversing force comprises:
   a hydraulic linear actuator rigidly secured to said base member and imparting periodically reversing, horizontal forces to said base member.

4. A device for transmitting a horizontally directed, periodically reversing force to the earth comprising:
   a base member for contacting the earth;
   means for imparting a horizontally directed, periodically reversing force to said base member;
   means vibrationally isolated from said base member for forcing said base member into rigid placeemnt on the earth; and
   means for rigidly engaging the earth pivotally attached on each side of said base member in line with said horizontal, periodically reversing force application, said engaging means each being directed with a downward component of force and a horizontal component of force which is opposite from and at least equal to the respective forces from said means for imparting periodically reversing horizontal forces.

5. A device as set forth in claim 4 wherein said means for imparting horizontal, periodically reversing forces comprises:
   a pair of spaced vertical plate members rigidly affixed perpendicular to said base member and parallel to each other; and
   a linearly actuated hydraulic vibrator affixed between said vertical plate members to impart alternating horizontal forces to said base member.

6. A device as set forth in claim 4 wherein said vibrationally isolated means for forcing said base member comprises:
   a supporting vehicle;
   vibration damping means secured to each side of said base member;
   a pair of hydraulic cylinder and piston rod means affixed to said supporting vehicle to extend vertical force applications, said piston rods being secured to said vibration damping means.

7. A device as set forth in claim 6 wherein said earth engaging means each comprises:
   first vertically disposed hydraulic cylinder and piston rod means connected to the supporting vehicle and having the piston rod connected for downward displacement of said earth engaging means; and
   second horizontally disposed hydraulic cylinder and piston rod means being pivotally connected between said base member and said earth engaging means and each exerting a force at least equal to the periodically reversing horizontal force imparted to said base member.

8. A vehicle mounted transducer apparatus for imparting shear waves to an earth medium, comprising:

a base member;

a vibrator secured to said base member to impart periodically reversing horizontal forces thereto;

vibration damping means secured to said base member;

hydraulic means connected between said vehicle and said vibration damping means which, upon extension, forces said base member into rigid contact with said earth medium;

vertical earth engaging plates disposed on each side of said base member in line with said periodically reversing horizontal vibrator force and engaging the earth substantially normal to said line;

vertical hydraulic means spring-mounted to said vehicle and pivotally affixed to said vertical earth engaging plates to exert downward force on said vertical earth engaging plates; and horizontal hydraulic means pivotally affixed to said base member and rigidly affixed to said vertical earth engaging plates to exert horizontal force on said engaging plates.

9. A vehicle mounted transducer as set forth in claim 8 wherein said vibrator means comprises:

a linearly actuated hydraulic vibrator.

10. A vehicle mounted transducer as set forth in claim 9 wherein said base member comprises:

a base plate for contacting said earth medium; and a pair of vertical support plates rigidly secured in upright, parallel relationship to said base plate, one on each side, for supporting the vibrator and transmitting the periodically reversing horizontal forces to said base member.

11. A vehicle mounted transducer as set forth in claim 8 wherein said vibration damping means and hydraulic means comprises:

a pair of pneumatic pillow bags affixed to each side of the base member;

a pair of pistons having their rods affixed to said pneumatic pillow bags; and a pair of hydraulic cylinders secured to said vehicle and containing said piston rods in driving relationship.

12. A vehicle mounted transducer as set forth in claim 8 wherein said vertical and horizontal hydraulic means comprise:

a pair of vertical hydraulic cylinders;

spring damping means for securing said vertical cylinders to said vehicle;

piston rod means extending their rods downward from within each vertical cylinder into pivotal connection with said vertical earth engaging plates;

four horizontal hydraulic cylinders pivotally secured to said base member, two on each side in spaced apart relationship; and four piston rod means extending their rods outward from within the respective horizontal cylinders into rigid connection with said vertical earth engaging plates.

13. A vehicle mounted transducer as set forth in claim 8 which is further charatcerized to include:

hydraulic control means for actuating said hydraulic means to a selected position and thereafter maintaining a constant force output from said vertical and horizontal hydraulic means which is at least as great as the periodically reversing horizontal forces.

14. A vehicle mounted transducer apparatus for imparting shear waves to an earth medium, comprising:

a base plate for rigidly contacting the earth medium;

a pair of vertical support plates secured in upright, parallel position on opposite sides of said base plate;

vibrator means secured to said support plates for lateral vibration therebetween, such that periodically reversing horizontal forces are imparted through said support plates and base plate to said earth medium;

pneumatic pillow bags affixed to each side of said base plate;

a pair of hydraulic means secured to said vehicle and affixed to said pillow bags for supporting the weight of the vehicle over the base plate;

a pair of vertical earth engaging plates disposed on opposite sides of said base plate in line with said horizontal forces and engaging the earth medium normal to such line;

a pair of vertical hydraulic means resiliently affixed to said vehicle and pivotally secured to said vertical earth engaging plates;

two horizontal hydraulic means, pivotally secured to each of said support plates and in spaced apart relationship to extend generally, laterally outward, and their opposite ends being connected to the respective vertical earth engaging plate; and hydraulic control means for actuating said hydraulic means to a selected, closed position while maintaining constant pressure on said vertical and horizontal hydraulic means.

References Cited

UNITED STATES PATENTS

| | | | |
|---|---|---|---|
| 2,740,489 | 4/1956 | White et al. | 181—.5 |
| 3,149,232 | 12/1964 | Fair | 181—.5 |
| 3,159,233 | 12/1964 | Clynch et al. | 181—.5 |
| 3,280,935 | 10/1966 | Brown | 181—.5 |
| 3,286,783 | 11/1966 | Cherry et al. | 181—.5 |

BENJAMIN A. BORCHELT, *Primary Examiner.*

W. KUJAWA, *Assistant Examiner.*